United States Patent [19]

Winkelman, Jr. et al.

[11] 4,418,967

[45] Dec. 6, 1983

[54] WAFFLE FURNITURE SYSTEM

[76] Inventors: Henry T. Winkelman, Jr., 7405 Maryland Ave., St. Louis, Mo. 63130; Edward E. Huckaby, 9802 Westview, Houston, Tex. 77050

[21] Appl. No.: 289,124

[22] Filed: Jul. 31, 1981

[51] Int. Cl.³ .................. A47B 87/00; F16B 12/00
[52] U.S. Cl. .................... 312/107; 312/108; 312/111; 312/194
[58] Field of Search ............... 312/111, 107, 108, 194

[56] References Cited

U.S. PATENT DOCUMENTS

| | | | |
|---|---|---|---|
| 1,434,220 | 10/1922 | Morris | 312/107 |
| 2,258,909 | 10/1941 | Reens | 312/111 |
| 2,965,428 | 12/1960 | Jacobs et al. | 312/107 |
| 3,234,896 | 2/1966 | Bonsall | 312/111 |
| 3,635,174 | 1/1972 | Ball et al. | 312/194 |
| 3,822,924 | 7/1974 | Lust | 312/111 |
| 3,848,942 | 11/1974 | Fanini | 312/111 |
| 3,874,753 | 4/1975 | Naito et al. | 312/111 |
| 3,885,845 | 5/1975 | Krieks | 312/108 |
| 4,178,047 | 12/1979 | Welch | 312/111 |
| 4,319,795 | 3/1982 | Klaus | 312/111 |

FOREIGN PATENT DOCUMENTS 1297387  5/1962  France ..................... 312/111

*Primary Examiner*—Victor N. Sakran
*Attorney, Agent, or Firm*—Guy E. Matthews

[57] ABSTRACT

An office furniture system is disclosed that provides an unlimited variety of assembly configurations from basic component parts. To meet changing needs, configurations such as desks, drafting tables, cubicles, stands, shelves, may be easily disassembled and reassembled into configurations more suited to current needs. Rectangular panels are positioned such that the edges of some panels fit into grooves in the side of other panels and are held firmly together by a unique bolting system.

7 Claims, 11 Drawing Figures

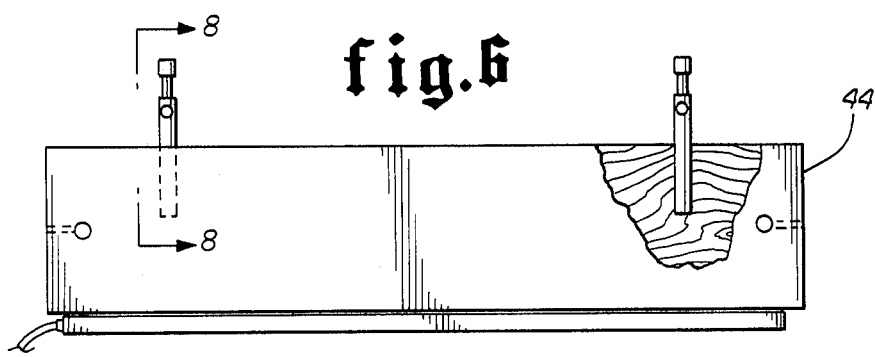
fig.6
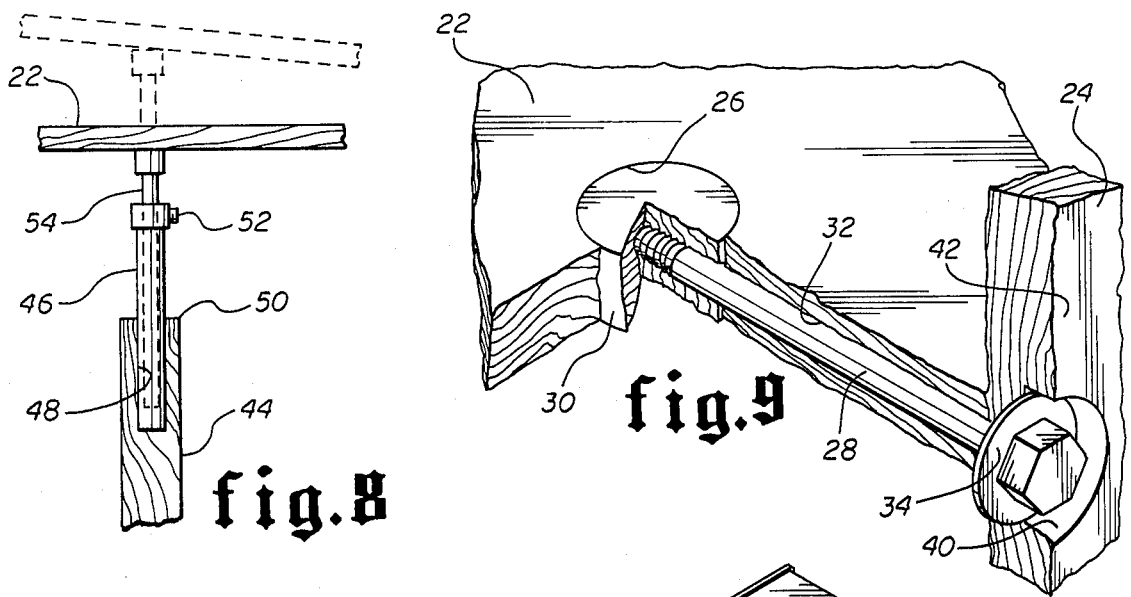
fig.8
fig.9
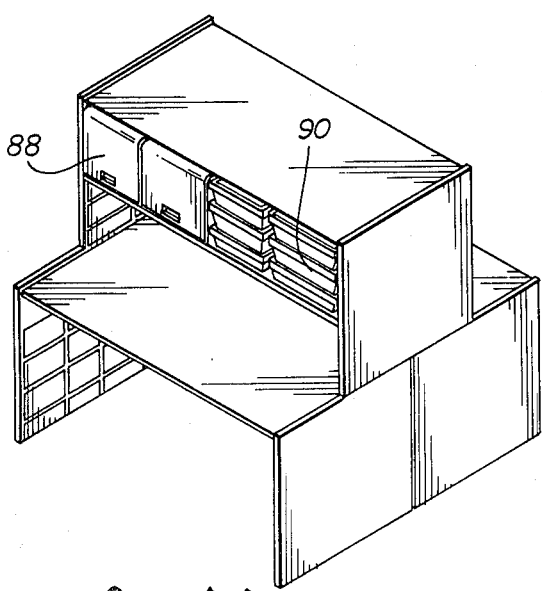
fig.10
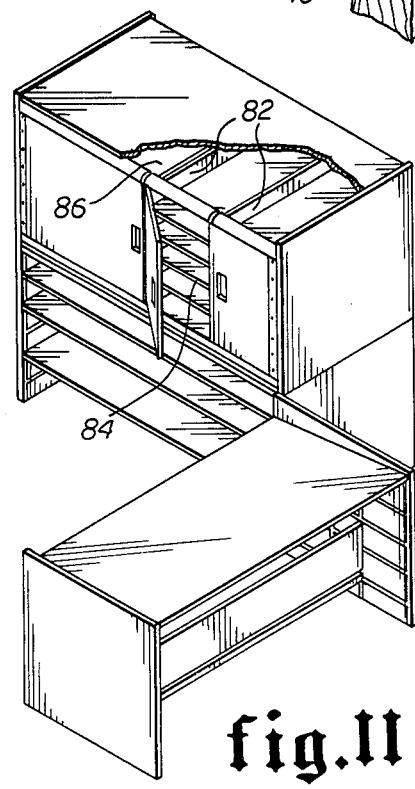
fig.11

WAFFLE FURNITURE SYSTEM

FIELD OF THE INVENTION

The present invention relates generally to office furniture including desks, drafting tables, cubicles, stands and crates and more particularly, to furniture that may be reversably assembled from a selection of component parts into a variety of useful forms.

BACKGROUND OF THE INVENTION

Experienced office managers have long been confronted with the problem of finding specific desired types of furniture in a desired size that blends well with the office decor. It is also a continuing problem to replace furniture when damage, a change of functions, reorganization, moving or such make it necessary. Although new furniture constitutes a sizeable budget item, the furniture being replaced often is worth less than what it may cost to sell it. When furniture cannot be found to meet exacting functional needs, expensive supplementary equipment is often required that may substantially increase the cost and indeed, may not properly meet the functional need.

For many years, height adjustments have been offered in swivel chairs, drafting tables and modular assemblies of furniture for home and office, generally called "stack furniture" have been found to have certain advantages. However, no system components are available that can be easily and inexpensively assembled into a variety of sturdy and practical types of office furniture such that the same components may be disassembled and reassembled into other types and sizes of office furniture to meet the changing needs the office functions may require. Therefore, features of the present invention include: a system for providing furniture of specific desired types and sizes; a furniture system having components that may be assembled into a first series of configurations, disassembled and reassembled into a second series of configurations; a furniture system having means for fast, easy and sturdy assembly into desired functional pieces of furniture; a system for reversably mounting one or more display panels with the furniture system; a system for providing a file storage system mounted with the furniture system; a system for providing electrical outlets mounted with the furniture system. These and other features and advantages will be apparent in view of the following descriptions and the attached drawings.

SUMMARY OF THE INVENTION

An office furniture system is provided that comprises: a plurality of component parts that may be removably assembled into any of a variety of functional items such as desks, drafting tables, cubicles, stands and crates; generally rectangular panels that may be joined edge to side, edge to edge and side to side so as to achieve a desired functional configuration; fast and simple means for joining the panels so as to provide sturdy and durable assemblies; means for providing shelves, dividers, drawers, trays, adjustable inclined work surfaces, display panels, doors, and electrical outlets mounted with the system.

BRIEF DESCRIPTION OF THE DRAWINGS

FIG. 6 is a front view of the lower back panel shown in FIG. 7.

FIG. 8 is a vertical section taken along line 8—8 of FIG. 6.

FIG. 9 is an isometric section taken along line 9—9 of FIG. 3 after assembly per FIG. 1 so as to illustrate an assembly feature.

FIG. 10 illustrates an assembly of a twin desk.

FIG. 11 illustrates an assembly of an L-shaped desk.

DESCRIPTION OF THE PREFERRED EMBODIMENT

Figure 1:
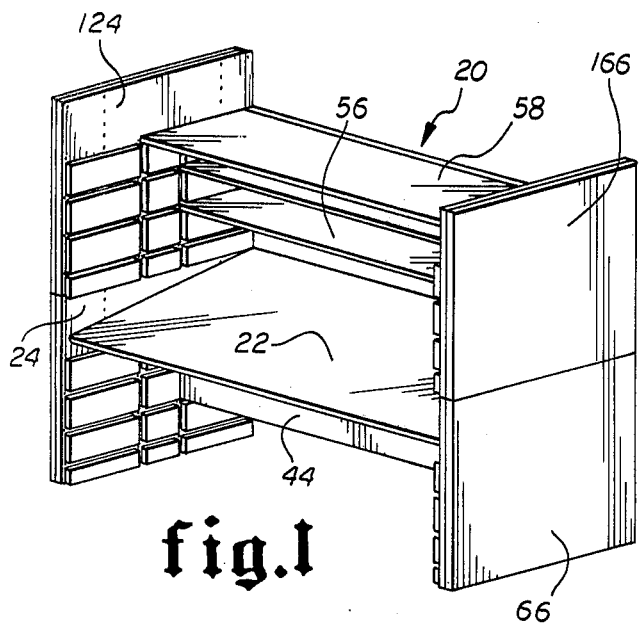
FIG. 1 illustrates a desk assembled in accord with the present invention.
Figure 2:
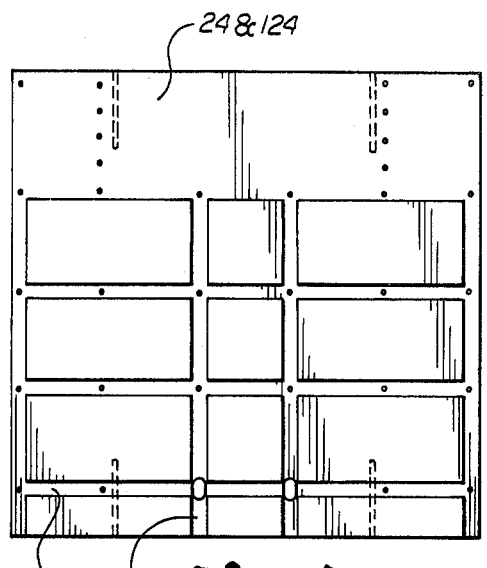
FIG. 2 is an inside view of an upper end panel taken from FIG. 1.
Figure 3:
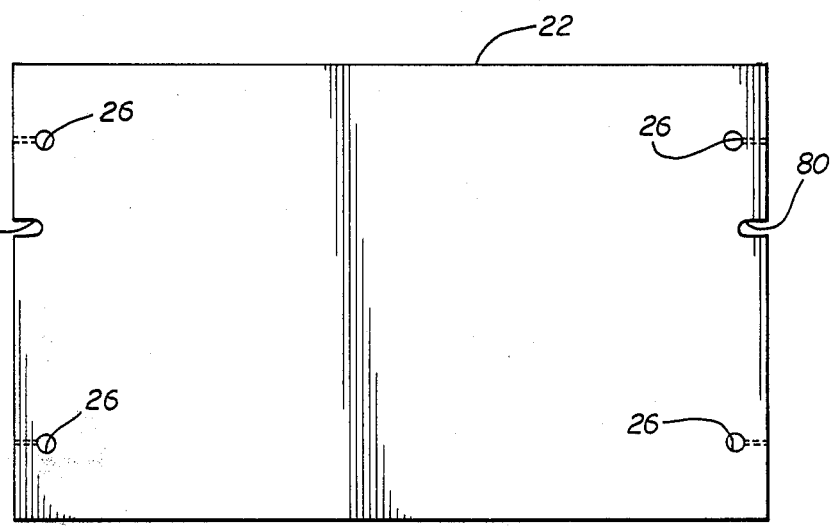
FIG. 3 is a plan view of the inclined work surface of FIG. 1.
Figure 7:
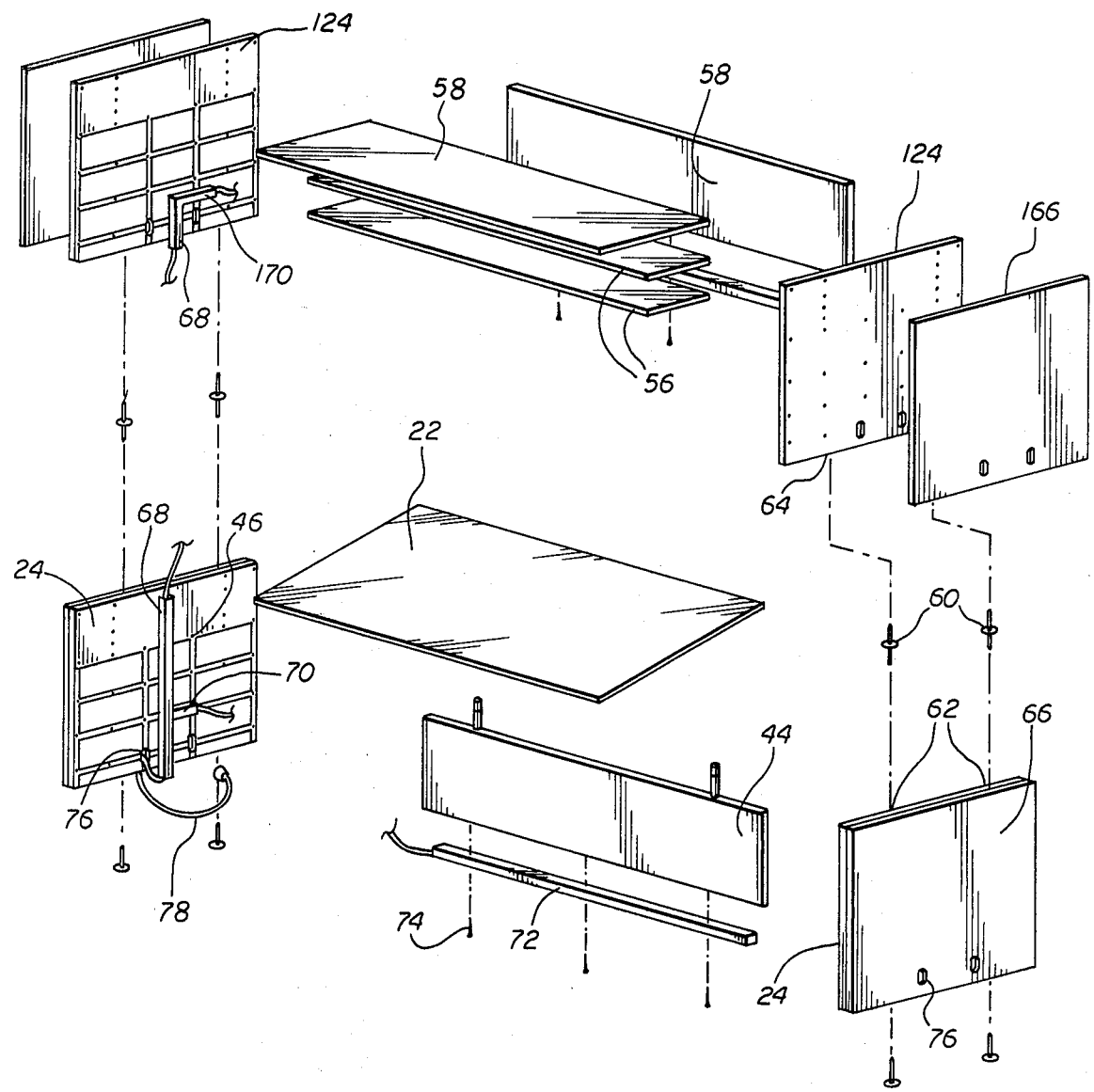
FIG. 7 is an exploded view of the desk shown in FIG. 1.

Desk 20 as shown in FIG. 1 may be assembled from parts as shown in FIG. 7. Inclined work panel 22 positioned between lower end panels 24 is retained therebetween by means as depicted by FIG. 9. Opening 26 is formed in panel 22 at a distance convenient for engagement of bolt 28 with barrel nut 30. Bolt 28 extends through opening 32 formed between the edge of panel 22 and opening 26 and bolt 28 also extends through opening 34 formed through panel 24 so as to communicate with opening 32 of panel 22 such that bolt 28 may be tightened so as to hold the edge of panel 22 in tight engagement with the side of panel 24. So as to more positively position and support vertical and horizontal panels, end panel 24 may be provided with vertical grooves as at 36 and at 38 respectively, the grooves being of a convenient depth and width to slidably and snugly receive the edges of other panels as may be required. Each of the vertical, horizontal and inclined panels may be assembled with end panels 24 as described above and connectors as illustrated in FIG. 9.

Recess 40 may be provided in end panel 24 so as to position the head end of bolt 28 flush with surface 42 of panel 24. So as to stablize end panels 24 and to support the rear portion of panel 22, lower panel 44 may be positioned within vertical slots 46 of end panels 24 and assembled as depicted in FIG. 9. As best shown in FIGS. 6 and 8, bushings 46 may be positioned within receptacles 48 formed in the upper edge 50 of panel 44 such that set screw 52 operating through the wall of bushing 46 may be selectively tightened upon shaft 54 positioned within bushing 46 and extending thereabove to support the rear portion of panel 22 at an adjustable height, one bolt as per FIG. 9 rotatably positioning each end of the front portion of panel 22.

Figure 4:
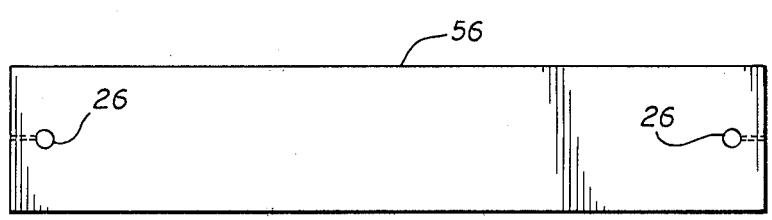
FIG. 4 is a plan view of a horizontal stiffening member as best shown in FIG. 7.
Figure 5:
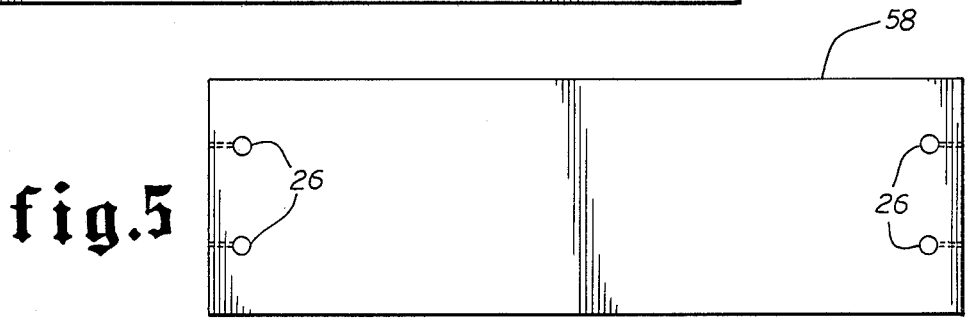
FIG. 5 is a front view of the upper back panel shown in FIG. 7.

Narrow panels 56 as depicted in FIG. 4 may be assembled as shown in FIGS. 1 and 7 to form shelves and panels as may be required, between upper end panels 124 which may be be identical to lower end panels 24, assembled as shown in FIG. 9. To maintain end panels 24 and 124 to act as one panel, dowel members 60 may be inserted into recepticals 62 formed in the upper edge of panel 24 and receptacles 64 formed in the lower edge of panel 124, receptacles 62 and 64 being aligned to receive dowel member 60.

Display panel 66 and identical panel 166 may be provided for mounting with panels 24 and 124 respectively so as to cover the outer side of the end panels such that recesses 40 will be covered and such that displays may be attached to the display panels as by pins or the like. The display panels are made of a suitable material such as cork board.

When it is of advantage to have electrical outlets mounted with desk 20, vertical electrical conduit 68 may be attached to the inner side of end panels 24 and 124, conduit 68 having horizontal branch conduits 70 and 170 connected with longitudinally disposed conduits such as 72 attached to the lower edge of panel 44 as by screws 74, such that electrical outlets may be provided at a variety of locations. To facilitate the connections of the electrical conduit to a power source, openings as at 76 may be provided in panels 24 and 66 through which electrical supply wire 78 may extend. So that vertical conduit 68 will not obstruct the positioning of panel 22, slots as at 80 may be formed in the ends of panel 22, sized and positioned to prevent contact between conduit 68 and panel 22. Intermediate vertical partitions 82 may be provided as shown in FIG. 11 when different functions are required for different portions of a given assembly. For instance, shelves 84, box shaped cabinet 86, file drawer 88 or drawers 90 may be provided by the assembly of component parts of the system.

It is therefore clear that many different configurations may be reversably assembled, each to meet special functional requirements, from basic component parts of the system. It is also clear that the present invention is well adapted to meet all of the features named herein and other features, uses and advantages will become obvious upon practice thereof.

What is claimed is:

1. A furniture system for assembly into various architectural office furniture components including desks, drafting tables, cubicles, stands, and crates, comprising
   a plurality of longitudinally extended generally rectangular work panels for work surfaces, desk tops, panels, and structural members;
   a plurality of end panels having means for receiving an edge of said work panels at a plurality of horizontally and vertically spaced apart places on said end panel whereby the end panels receive and maintain the work panels in a chosen, fixed, spatial relationship to the end panels, the relationship being changeable by engaging said work panels at different locations with said end panels; and wherein said means for receiving an edge of the work surfaces includes means for receiving an edge of the work surface adjacent an edge of said end panel;
   a plurality of longitudinally extended shelf panels having ends formed for engagement with said receiving means in said end panels in a chosen spatial relationship to the work panels and end panels whereby said shelf panels are mountable with said end panels as a shelf or lateral brace;
   means for fixing said work panels and said shelf panels to said end panels in a chosen spatial relationship, whereby said panels may be assembled into a variety of furniture components; and,
   wherein the means for receiving an end of said work panels and said shelf panels comprises a plurality of spaced apart grooves formed in one side of said end panels for engaging the edge of said work panel and the end of said panel; and,
   wherein said end panels have a plurality of holes formed therethrough for receiving bolts for connecting the end panels to the work panels and shelf panels, said holes in the end panels being located adjacent said grooves whereby a bolt through the hole may engage and retain a work panel or shelf panel in said groove; and,
   wherein said shelf panels have at least one hole formed in the end thereof for receiving a bolt situated through said end panels when the shelf panel is engaged with the groove in said end panel and wherein the shelf panel has at least one second hole formed therethrough in the end thereof communicating with the hole formed through said end panel, and wherein the means for connecting said shelf panel to said end panel comprises at least one bolt through said end panel and through said hole formed in the end of said shelf panel and engaging a threaded body mounted in the second opening in said shelf panel.

2. The system of claim 4 wherein said shelf panels have at least one hole formed in the end thereof for receiving a bolt situated through said end panels when the shelf panel is engaged with the groove in said end panel and wherein the shelf panel has at least one second hole formed therethrough in the end thereof communicating with the hole formed through said end panel, and wherein the means for connecting said shelf panel to said end panel comprises at least one bolt through said end panel and through said hole formed in the end of said shelf panel and engaging a threaded body mounted in the second opening in said shelf panel.

3. The system of claim 5 wherein said shelf panels have a plurality of grooves formed therein for receiving a plurality of divider plates having an edge thereof formed for engagement in the groove in said shelf panel whereby said divider plates are slidably mountable with said shelf panel to form a plurality of variably sized storage cubicles in the furniture units.

4. The system of claim 5 wherein the threaded body comprises a cylindrical barrel nut having a threaded axial opening formed therein for receiving and threadably engaging with said bolt, whereby tightening the bolt pulls said panels into rigid structural connection.

5. The system of claim 7 wherein said end panels include openings formed in at least one edge thereof for receiving a plurality of stacking pins, said pins being receivable in said openings in adjacent end panels whereby the end panels are stackable one above another by inserting stacking pins in the openings in at least one lower end panel and positioning at least one upper end panel above said lower end panel and inserting said pins in said openings therein.

6. The system of claim 8 including at least one display panel comprising a relatively soft material for receiving a pin to retain a display thereon and including means for mounting said display panel with said system.

7. The system of claim 9 including at least two mounting pins for threadably engaging the end panel and wherein said display panel has openings formed therethrough for receiving at least two mounting pins.

* * * * *